(12) United States Patent
Freire et al.

(10) Patent No.: US 10,374,538 B2
(45) Date of Patent: Aug. 6, 2019

(54) HARMONIC CONTROL OF A CONVERTER

(71) Applicant: Siemens Gamesa Renewable Energy A/S, Brande (DK)

(72) Inventors: Nuno Miguel Amaral Freire, Brande (DK); Yashan Hu, Ikast (DK); Zhan-Yuan Wu, Sheffield (GB)

(73) Assignee: Siemens Gamesa Renewable Energy A/S (DK)

( * ) Notice: Subject to any disclaimer, the term of this patent is extended or adjusted under 35 U.S.C. 154(b) by 0 days.

(21) Appl. No.: 16/178,631

(22) Filed: Nov. 2, 2018

(65) Prior Publication Data

US 2019/0140571 A1 May 9, 2019

(30) Foreign Application Priority Data

Nov. 7, 2017 (EP) ..................................... 17200324

(51) Int. Cl.
*H02P 101/15* (2016.01)
*H02P 9/42* (2006.01)
*H02P 9/02* (2006.01)

(52) U.S. Cl.
CPC .................. *H02P 9/42* (2013.01); *H02P 9/02* (2013.01); *H02P 2101/15* (2015.01)

(58) Field of Classification Search
CPC combination set(s) only.
See application file for complete search history.

(56) References Cited

U.S. PATENT DOCUMENTS

| 6,472,775 B1 | 10/2002 | Huang et al. | |
|---|---|---|---|
| 8,502,404 B2 | 8/2013 | Nakayama et al. | |
| 2009/0085354 A1* | 4/2009 | Tan | H02P 9/42 290/44 |
| 2011/0074365 A1* | 3/2011 | Nakayama | H02P 9/007 322/27 |

(Continued)

FOREIGN PATENT DOCUMENTS

| CN | 105515040 A | 4/2016 |
|---|---|---|
| EP | 2043255 A2 | 4/2009 |
| EP | 2485388 A1 | 8/2012 |

(Continued)

*Primary Examiner* — Daniel J Cavallari
(74) *Attorney, Agent, or Firm* — Schmeiser, Olsen & Watts LLP

(57) ABSTRACT

Provided is an arrangement for determining an operation parameter reference for controlling a generator side converter portion coupled to a generator, in particular of a wind turbine, the arrangement comprising: an arithmetic element configured to derive a fundamental current error by subtracting a, in particular unfiltered, generator output current from a sum of a fundamental current reference and at least one harmonic current reference; a fundamental current controller adapted to determine a fundamental operation parameter reference based on the fundamental current error; at least one other arithmetic element configured to derive at least one harmonic current error by subtracting a, in particular band pass filtered according to the harmonics, generator output current from the at least one harmonic current reference; at least one harmonic current controller configured to determine at least one harmonic operation parameter reference based on the harmonic current error.

15 Claims, 4 Drawing Sheets

(56) References Cited

U.S. PATENT DOCUMENTS

2014/0015497 A1\* 1/2014 Holliday .................. H02P 9/44
322/32
2014/0021894 A1 1/2014 Simili

FOREIGN PATENT DOCUMENTS

EP 2750270 A1 7/2014
KR 20130088440 A 8/2013

\* cited by examiner

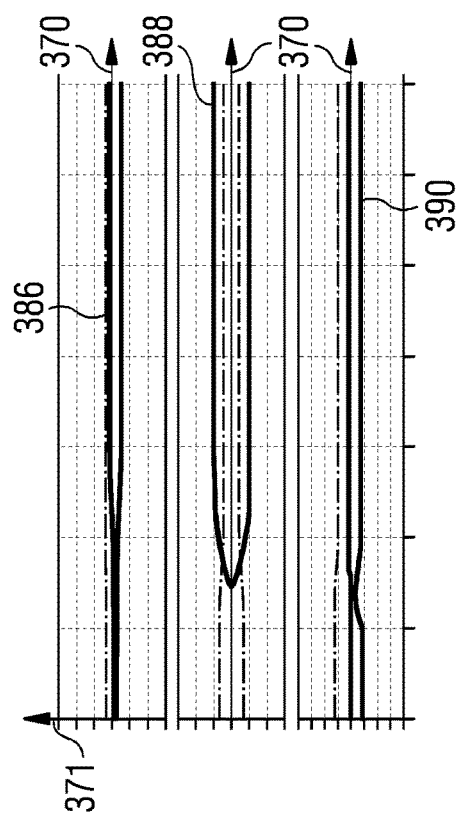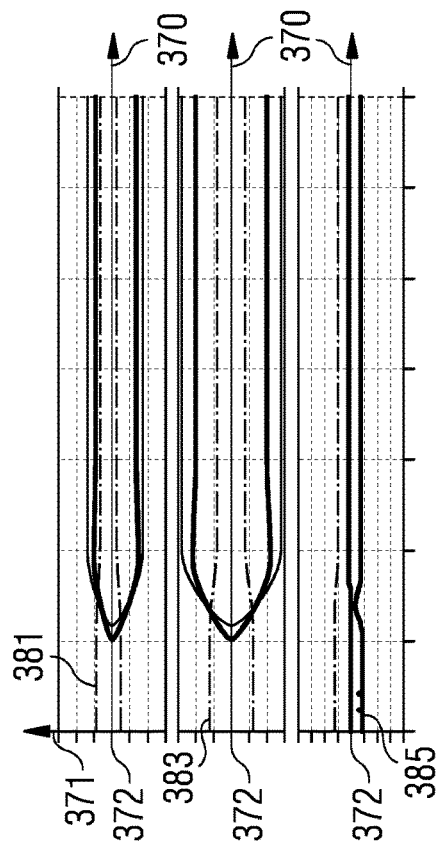

HARMONIC CONTROL OF A CONVERTER

CROSS-REFERENCE TO RELATED APPLICATIONS

This application claims priority to European Application No. 17200324.6, having a filing date of Nov. 7, 2017 the entire contents of which are hereby incorporated by reference.

FIELD OF TECHNOLOGY

The following relates to an arrangement and to a method for determining an operation parameter reference for controlling a generator side converter portion coupled to a generator, in particular of a wind turbine. Further, the following relates to an electric energy system comprising the arrangement and further relates to a wind turbine comprising the electric energy system.

BACKGROUND

Harmonic control, in particular in permanent magnet generators, may be required in order to control noise and vibration as well as to increase system efficiency. Harmonic control may in particular be applied to direct drive generators which do not have a gearbox in the drive train. Conventionally, a fundamental current controller and a harmonic current controller may be utilized in a vector controlled drive. Conventionally, a high control effort, poor dynamic performance, instability and inaccurate speed/position estimation has been observed to be present.

Conventionally, digital filters have been added to the current feedbacks, the bandwidth of the fundamental current control has been reduced and digital filters have been added to the voltage references used as inputs to a speed observer. Thereby, the control effort of the harmonic current controller may be reduced, the harmonic current controller dynamic performance may be improved and speed/position estimation may be improved regarding the accuracy. However, some major drawbacks are concurrently observed: (1) The introduction of filters may tend to undermine the system stability, thereby reducing stability margins; (2) reduction of the fundamental current controller bandwidth may reduce its dynamic performance and may negatively affect outer control loops.

Thus, there may be a need for an arrangement and for a method for determining an operation parameter reference for controlling a generator side converter portion coupled to a generator, wherein at least some of the above-mentioned issues are addressed, wherein in particular a simple solution having sufficient system stability is achieved.

SUMMARY

Embodiments of the present invention may in particular be applied for the harmonic control in vector-controlled drives, namely the control of permanent magnet synchronous generators used in for example wind turbine applications.

According to embodiments of the present invention it is provided an arrangement for determining an operation parameter reference for controlling a generator side converter portion coupled to a generator, in particular of a wind turbine, the arrangement comprising: an arithmetic element configured to derive a fundamental current error by subtracting a, in particular unfiltered, generator output current from a sum of a fundamental current reference and at least one harmonic current reference; a fundamental current controller adapted to determine a fundamental operation parameter reference based on the fundamental current error; another arithmetic element configured to derive at least one harmonic current error by subtracting a, in particular band pass filtered according to the harmonics, generator output current from at least one harmonic current reference; at least one harmonic current controller configured to determine at least one harmonic operation parameter reference based on the harmonic current error; still another arithmetic element configured to determine the operation parameter reference as sum of the fundamental operation parameter reference and the at least one harmonic operation parameter reference.

The arrangement may be part of a wind turbine controller, such as implemented in software and/or hardware. The operation parameter reference may be a reference value of an operation parameter of the generator. The operation parameter may at least partly define the operation of the generator, for example regarding its electrical output, its mechanical or electrical rotational speed, the generated torque or the like. In particular, the operation parameter reference may be a voltage reference which may be supplied to the generator side converter portion (of a for example AC-DC-AC converter) for actually controlling the generator side converter portion, in particular after having determined, from the operation parameter reference, pulse width modulation signals suitable for being supplied to gates of controllable switches in the converter portion.

The generator output current may have been measured or may have been estimated using other operational parameters. The fundamental current reference and also at least one harmonic current reference may be determined or defined in a number of ways. The fundamental current reference and the harmonic current reference may for example just be a constant or may be derived by looking up a look-up table or the like. In other embodiments, the fundamental current reference and/or harmonic current reference may depend on the operation parameter reference itself, may depend on the generator output current and may also depend on a DC voltage of a DC link between the generator side converter portion and a grid side converter portion. The converter may for example be or comprise a AC-DC-AC converter which may be configured to convert a variable frequency output power provided by the generator to a substantially DC power at the DC link and from the DC power to a fixed frequency AC output power, for example having a frequency of 50 Hz or 60 Hz.

The arrangement may be configured to control (in particular concurrently) at least one or two or three or four or even more harmonics of a fundamental frequency of the operation parameter by determining the appropriate operation parameter reference. In the case more than one harmonic is controlled, the sum is formed by the fundamental current reference and all harmonic current references, regarding all different harmonics to be controlled, for example a second, a fourth, a sixth, an eighth, and/or a twelfth harmonics. For each of the harmonics to be controlled, a corresponding harmonic current controller may be comprised in the arrangement which is configured to handle the particular harmonic, such as e.g. a second, a fourth, a sixth, an eighth or a twelfth harmonic of the fundamental electrical frequency of the generator.

Different from systems according to the state of the art, the fundamental current controller receives the sum of the fundamental current reference and all the harmonic current references (to be controlled) which is diminished by the generator output current, in particular an unfiltered generator output current. Conventionally, the generator output current may have been filtered to reduce higher harmonics. Further, conventionally, the fundamental current controller may have received as input the difference between the filtered generator output current and the fundamental current reference without also subtracting (for each of the harmonics to be controlled) the associated harmonic current reference. Thereby, filtering of the generator output current is avoided, thus simplifying the arrangement and also possibly improving the stability.

In particular, embodiments of the present invention may be capable of improving the performance of the control system without the drawbacks of the common approaches mentioned above as observed in the conventional systems. According to embodiments of the present invention, the current reference used for the fundamental current controller is modified which may also include the harmonic current reference. This simple modification may completely eliminate or at least partly eliminate a strong disturbance rejection as observed by the fundamental current controller under steady-state performance when the harmonic frequency falls in the bandwidth of the fundamental current controller and may also minimize it during transients. As a result, under steady-state operation, the regulation error (i.e. the fundamental current error) at the input of the fundamental current controller may be free of harmonics as well as its output with lack of need for additional digital filters, thus safeguarding the stability of the control system. According to embodiments of the present invention, both, the fundamental current controller and also the harmonic current controller(s) may contribute towards the same target instead of opposing each other. In other words, the harmonic current controller(s) may not need to make an extra effort to counteract the action of the fundamental current controller.

The generator output current may be bandpass-filtered (passing through the harmonics under consideration) before being subtracted from the respective harmonic current reference.

In general, the fundamental current controller and the harmonic current controller may comprise PI-controllers which may be configured such that they produce output signals which, when supplied as operational parameter reference to the converter portion, lead to a decrease of the errors (i.e. the fundamental current error and the harmonic current error, respectively). Thereby, the control may in particular be applied in the fundamental dq-frame within the fundamental current controller and may be applied in the respective harmonic dq-frame in the respective harmonic current controller. Embodiments of the present invention support a respective control of the converter generator portion in order to eliminate one or more of undesired harmonic(s) or may also enable to achieve particular levels of particular harmonics at the output of the generator which levels may not be zero. Thereby, an effective control which may be implemented in a simple manner and a reliable stable operation may be provided.

According to an embodiment of the present invention, the operation parameter reference is a voltage reference or a power reference or a rotational speed reference or a torque reference for controlling the generator side converter portion. Thereby, a voltage control, a power control, a speed control, or a torque control may be applied. Thus, conventional control methods may be supported by the arrangement.

According to embodiment of the present invention, the harmonic current reference comprises an oscillation corresponding to N times a fundamental electrical frequency of the generator, wherein N in a natural number equal to or larger than 2, in particular being 2 or 4 or 6 or 8 or 12, wherein the harmonic current reference is in particular different from zero.

The fundamental electrical frequency of the generator may be derived based on the rotational speed of the generator and taking into account the number of poles and/or number of permanent magnets. Several different harmonics may be controlled by the arrangement by providing for each harmonics to be controlled a respective harmonic current controller. Each of the harmonic current controllers may receive as input a difference between the respective harmonic current reference and the filtered (e.g. bandpass for the respective harmonic) version of the generator output current. All outputs, i.e. the harmonic operation parameter references for the different harmonics may later be summed and added to the fundamental operation parameter reference to arrive at the operation parameter reference. Thus, a flexible control may be provided.

According to an embodiment of the present invention, the fundamental current reference and the harmonic current reference are given in a fundamental dq-frame rotating with the fundamental electrical frequency of the generator. The fundamental dq-frame rotates with the fundamental frequency of the generator. Thus, the fundamental current reference may be substantially a DC quantity. Thereby, processing the quantity may be performed in a simple manner.

According to an embodiment of the present invention, the fundamental current controller comprises two PI-controllers, to determine the fundamental operation parameter reference, using for each of the d-component and the q-component of the fundamental current error in the fundamental dq-frame one PI-controller of the two PI-controllers.

Alternatively, the fundamental current controller may be comprised of four PI controllers, two for the positive sequence frame (rotating with the fundamental frequency in forward direction) as already mentioned, and the other two for the negative sequence frame (rotating with the fundamental frequency in backward direction).

The PI-controller(s) may each comprise a proportional branch and an integral branch each receiving the respective current error as input. The outputs of the two branches are respectively added together for each of the d-component and the q-component in the fundamental dq-frame. Thereby, conventionally available controllers may be utilized in embodiments according to the present invention.

According to embodiments of the present invention, the harmonic current controller comprises: a transformation module configured to transform the harmonic current error in the fundamental dq-frame into a harmonic dq-frame (e.g. in two separate positive and negative directions), the harmonic dq-frame rotating with the respective multiple of the fundamental frequency; two PI-controllers configured to receive the components of the harmonic current error in the harmonic dq-frame as inputs; a backtransformation module configured to backtransform the outputs of the PI-controllers into in the fundamental dq-frame, in order to determine the harmonic operation parameter reference.

The harmonic dq-frame rotates with the respective multiple of the fundamental frequency corresponding to the harmonic to be controlled. After transforming the harmonic current error into the harmonic dq-frame, the corresponding error may substantially be a DC value. Thereby, calculations and the control may be simplified.

According to embodiments of the present invention, the arrangement further comprises an electrical speed estimator configured and connected to estimate an electrical rotational speed and/or an electrical angle of the generator based on the generator output current and in particular further based on the unfiltered fundamental operation parameter reference.

The speed estimator may estimate the rotational speed or the electrical frequency and the rotational position based on for example the reference voltage and the measured current output of the generator. Thus, measuring the mechanical speed/frequency may not be necessary, thereby simplifying the method.

According to embodiments of the present invention, the fundamental voltage reference which is supplied to the speed estimator does not comprise, during steady-state operation, any harmonics. Thus, filtering the fundamental operation parameter reference may not be necessary, different from the conventional methods. Thereby, the stability of the system may be improved and the system may be simplified.

According to embodiments of the present invention, the fundamental current controller and/or the harmonic current controller receives as input the electrical rotational speed (or frequency) and/or an electrical angle estimated by the electrical speed estimator. The electrical rotational speed and the electrical angle may be required for performing the control and in particular to perform a transformation into the harmonic dq-frame.

According to embodiments of the present invention, the arrangement further comprises at least one harmonic current reference calculation module configured to calculate the harmonic current reference based on at least one current reference input; and/or a fundamental current reference calculation module configured to calculate the fundamental current reference based on at least one of the current reference input, wherein the current reference input comprises: the operation parameter reference, in particular voltage reference, and/or the generator output current, and/or a DC-link voltage, and/or an electrical frequency of the generator, and/or an electrical angle of the generator, and/or a torque, and/or an acceleration and/or a sound pressure.

The reference calculation modules are optional and may be missing in other embodiments. The current references may be simply constants supplied to the arrangement. Depending on which quantity is controlled (for example voltage, power, torque), the respective current reference calculation modules may be configured differently, in particular regarding the configuration, such as look-up tables or the like. For each harmonic to be controlled, a respective harmonic current reference calculation module may be provided.

According to embodiments of the present invention, the arrangement further comprises a dq-abc-transformation module configured to transform the operation parameter reference given in the fundamental dq-frame into a stator frame; a modulator configured to derive pulse width modulation signals based on the operation parameter reference given in the stator frame and connected to supply the width modulation signals to gates of controllable switches comprised in the generator side converter portion. Thereby, conventional pulse width modulation control methods are supported.

According to embodiments of the present invention, the arrangement further comprises an abc-dq-transformation module configured to transform the generator output current in the stator frame into the fundamental dq-frame. Thereby, the output current of the generator may conveniently be subtracted from the current references before supplying the difference to the respective harmonic current controller and the fundamental current controller.

According to embodiments of the present invention it is provided an electric energy system, comprising: a generator; a converter comprising a generator side converter portion coupled to the generator; and an arrangement according to one of the preceding embodiments.

The converter may further comprise a grid side converter portion which may be connected to a utility grid to which electric energy is output from the electric energy system.

Furthermore, a wind turbine comprising the electric energy system is provided which may comprise a wind turbine tower, a nacelle provided on top of the wind turbine tower, wherein the generator and the converter and also the arrangement may be arranged e.g. within the nacelle or in another component of the wind turbine.

It should be understood that features, individually or in any combination, disclosed, explained, provided or applied for an arrangement for determining an operation parameter reference for controlling a generator side converter portion may also be applied, individually or in any combination, to a method for determining an operation parameter reference for controlling a generator side converter portion according to embodiments of the present invention and vice versa.

According to embodiments of the present invention it is provided a method for determining an operation parameter reference for controlling a generator side converter portion coupled to a generator, in particular of a wind turbine, the method comprising: deriving a fundamental current error by subtracting a generator output current from a sum of a fundamental current reference and at least one harmonic current reference; determining a fundamental operation parameter reference based on the fundamental current error; deriving at least one harmonic current error by subtracting a filtered generator output current from at least one harmonic current reference; determining at least one harmonic operation parameter reference based on the at least one harmonic current error; determining the operation parameter reference as sum of the fundamental operation parameter reference and the at least one harmonic operation parameter reference.

Furthermore, it is provided a method for controlling a generator side converter portion coupled to a generator, comprising: performing a method for determining an operation parameter reference according to the preceding embodiment and controlling the generator side converter portion coupled to a generator based on the operation parameter reference.

Embodiments of the present invention are now described with reference to the accompanying drawings. The following is not restricted to the illustrated or described embodiments.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION

Some of the embodiments will be described in detail, with references to the following Figures, wherein like designations denote like members, wherein:

FIG. 1 schematically illustrates a wind turbine comprising an arrangement;

FIG. 2 schematically illustrates a block diagram of an arrangement as comprised in an electric energy system;

FIG. 7 illustrates a graph illustrating control performance as considered in another embodiment of the present invention;

FIG. 8 illustrates a graph illustrating control performance as considered in another embodiment of the present invention.

DETAILED DESCRIPTION

Figure 1:
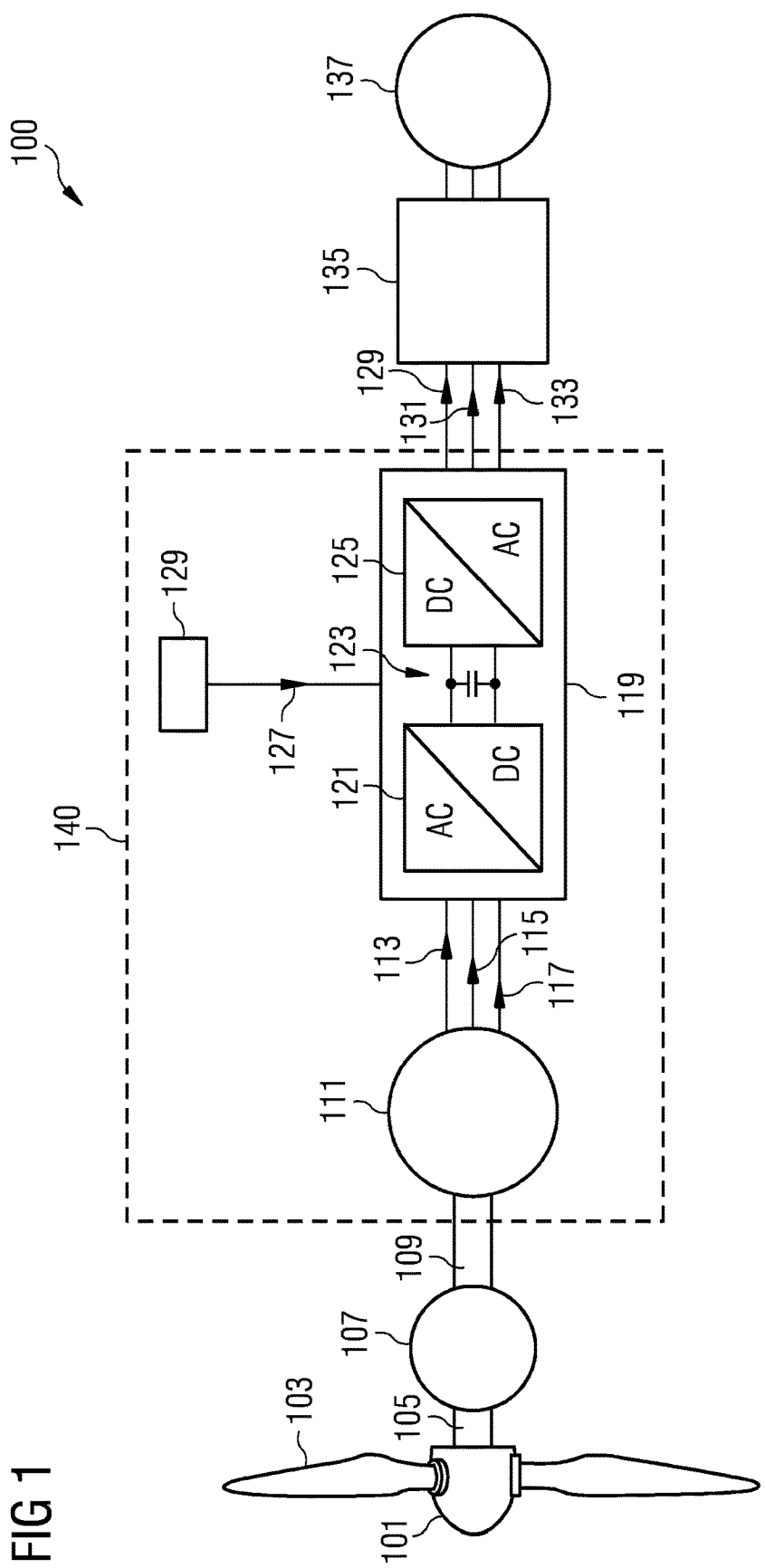

The illustration in the drawings is in schematic form. It is noted that in different figures, similar or identical elements are provided with the same reference signs or with reference signs, which are different from the corresponding reference signs only within the first digit.

The wind turbine 100 schematically illustrated in FIG. 1 comprises a hub 101 at which plural rotor blades 103 are connected. The hub is connected with a primary shaft 105 which is mechanically connected to an (optional) gearbox 107. A secondary shaft 109 also mechanically coupled to the gearbox 107 drives a generator 111 having a not illustrated stator with one or more winding sets and having a rotor with permanent magnets being connected to the secondary shaft 109. Upon rotation of the secondary shaft 109 and the rotor with the permanent magnets comprised in the generator 111, electric energy is generated by the generator 111 and is output by a three-phase power stream 113, 115, 117. The power stream is a variable frequency power stream due to the variable rotational speed of the rotation of the hub 101 including the rotor blades 103.

Therefore, the wind turbine 100 comprises an AC-DC-AC converter 119 which comprises a generator side converter portion 121, a DC link 123 and a grid side converter portion 125. The generator side converter portion 121 is in particular configured as an AC-DC converter and the grid side converter portion 125 is configured as a DC-AC converter portion. The conversions in the portions 121, 125 are achieved by controlling plural controllable switches using pulse width modulation signals which are derived based on an operation parameter reference 127 which is supplied from a wind turbine controller 129 which may comprise an arrangement for determining an operation parameter reference for controlling a generator side converter portion according to an embodiment of the present invention and which will be described in more detail with reference to FIG. 2 below.

The variable frequency output power 113, 115, 117 is converted by the generator side converter portion 121 to a substantially DC output power at the DC link 123 and is then converted to a fixed frequency output power 129, 131, 133 by the grid side converter portion 125. The output power is supplied to a (optional) transformer 135 which transforms the output voltage to a higher voltage before supplying the output power to the utility grid 137. The wind turbine 100 comprises the electric energy system 140 according to an embodiments of the present invention.

Figure 2:
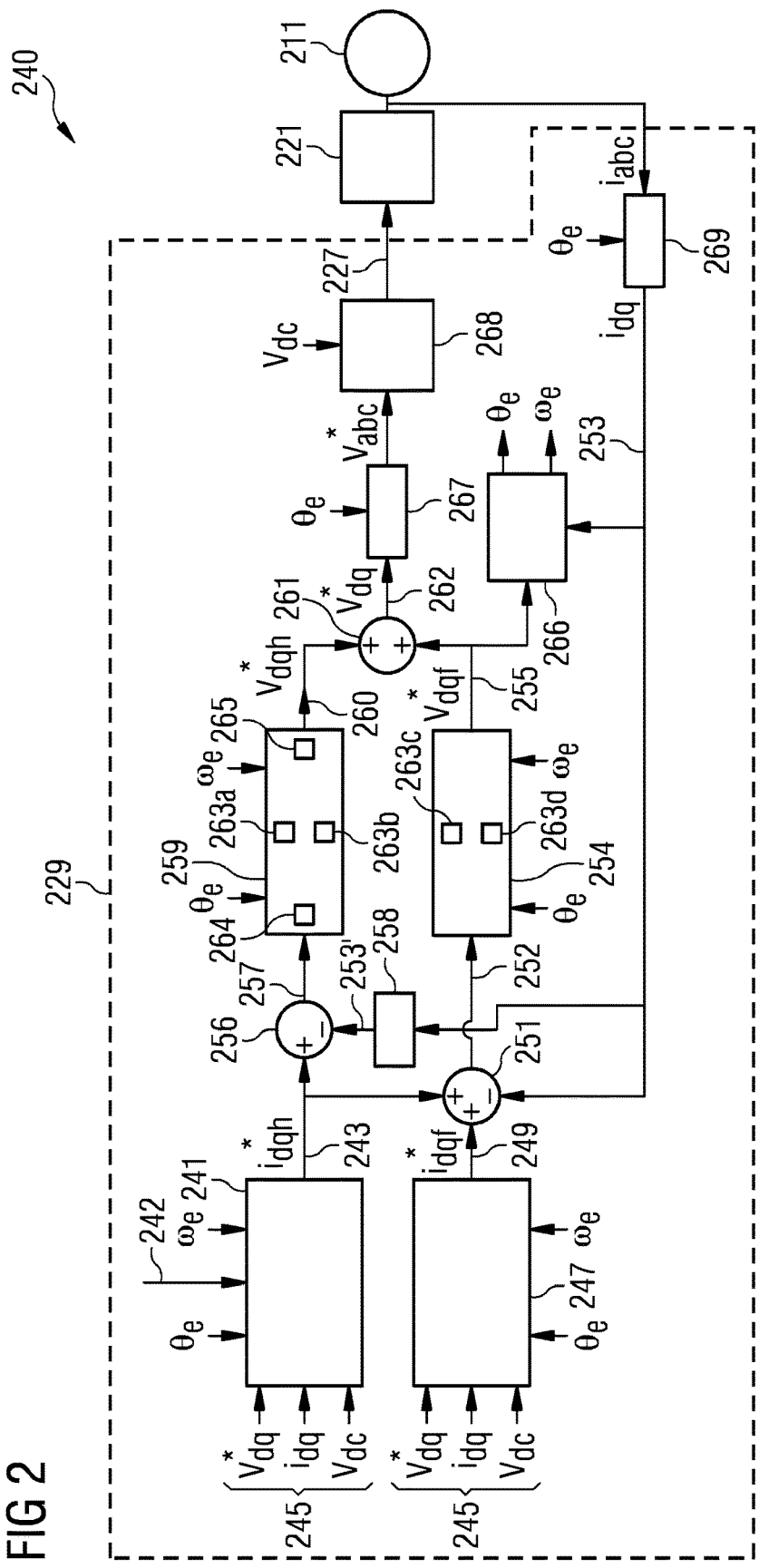

FIG. 2 schematically illustrates an electric energy system 240 according to an embodiment of the present invention comprising an arrangement 229 according to an embodiment of the present invention for determining an operation parameter reference for controlling a generator side converter portion 221 coupled to a generator 211.

Thereby, the arrangement 229 comprises at least one harmonic current reference calculation module 241 configured to calculate a harmonic current reference 243 (i*dqh) based on at least one current reference input 245, for example a voltage reference v*dq, the generator output current idq and the DC link voltage Vdc. Furthermore, the arrangement 229 comprises a fundamental current reference calculation module 247 which is configured to calculate a fundamental current reference 249 (i*dqf) based on at least one of the current reference input 245. Alternatively, other inputs 245 may be provided. Furthermore, the current reference calculation modules 241 and 247 receive the electrical frequency ωe and the electrical position Θe of the generator and/or may optionally receive input 242 for torque and/or acceleration and/or sound pressure. The input 242 may be relevant when aiming to reach closed-loop control of torque ripple for instance.

The arrangement 229 further comprises an arithmetic element 251 which is configured to derive a fundamental current error 252 by subtracting an unfiltered generator output current 253 ($i_{dq}$) from a sum of a fundamental current reference 249 and at least one harmonic current reference 243. Further, the arrangement comprises a fundamental current controller 254 adapted to determine a fundamental operation parameter reference 255 (in this case a voltage reference $v^*_{dqf}$) based on the fundamental current error 252.

The arrangement 229 further comprises at least one other arithmetic element 256 configured to derive at least one harmonic current error 257 by subtracting a bandpass-filtered generator output current 253' (using the bandpass filter 258) from at least one harmonic current reference 243.

The arrangement 229 further comprises at least one harmonic current controller 259 configured to determine at least one harmonic operation parameter reference 260 (in this case a harmonic voltage reference $v^*_{dqh}$) based on the harmonic current error 257.

Further, still another arithmetic element 261 is configured to determine the operation parameter reference 262 (here $v^*_{dq}$) as sum of the fundamental operation parameter reference 255 and at least one harmonic operation parameter reference 260.

If more than one harmonic is to be controlled by the arrangement 229, the arrangement comprises further harmonic current reference calculation module(s) and harmonic current controller(s) for the different harmonics which are connected in parallel to the modules 241 and 259. Further, to each of these branches, a corresponding bandpass filter adapted for filtering the particular harmonic is provided together with respective arithmetic addition elements. The still other arithmetic elements 261 will then add all harmonic current references to the fundamental reference 255.

In the illustrated embodiment, the fundamental and harmonic operation parameter references 255, 260 relate to a voltage reference. In other embodiments, a power reference, a rotational speed reference or a torque reference may be derived within the arrangement 229.

As can be taken from the subscripts used in the method scheme or block scheme illustrated in FIG. 2, the electrical quantities are frequently given in components of a dq-frame rotating with the fundamental electrical frequency of the generator. The fundamental current controller 254 (as well as the harmonic current controller 259 each) comprises two PI-controllers 263c, 263d (in other embodiments four PI controllers) for the d-component and the q-component.

In embodiments, both fundamental current controller and/or harmonic current controller may have up to four PI controllers, two for +dq (positive sequence) and two for −dq (negative sequence).

Furthermore, the harmonic current controller comprises a transformation module 264 which is configured to transform the harmonic current error 257 given in the fundamental dq-frame into a harmonic dq-frame and supplying the transformed signal to the two (in other embodiments four, two for the dq+ sequence and two for the dq-sequence) PI-controllers 263a, 263b for the d- and q-components.

The PI controllers 263a, 263b, 263c, 263d for the harmonic current controller and the fundamental current controller, respectively, may have a same structure, but their parameter setting may be commonly different.

The harmonic current controller 259 further comprises a backtransformation module 265 configured to backtransform the outputs of the PI-controllers 263a, 263b into the fundamental dq-frame in order to determine the harmonic operation parameter reference 260.

The arrangement 229 further comprises an electrical speed estimator 266 configured and connected to estimate an electrical rotational speed $\omega_e$ and/or an electrical angle $\Theta_e$ of the generator 211 based on the generator output current $i_{abc}$ (253) and further based on the unfiltered fundamental operation parameter reference 255 ($v^*_{dqf}$). Also, the fundamental current controller 254 and the harmonic current controller 259 both receive the electrical rotational speed $\omega_e$ and the electrical angle $\Theta_e$ as inputs, as estimated by the electrical speed estimator 266.

The arrangement 229 further comprises a dq-abc-transformation module 267 configured to transform the operation parameter reference 262 given in the fundamental dq-frame into a stator frame, i.e. into the quantity $v^*_{abc}$. Furthermore, a modulator 268 is provided for deriving pulse width modulation signals 227 based on the operation parameter reference $v^*_{abc}$ or based on the operation parameter reference in another frame, such as in the dq-frame as 262 ($v^*_{dq}$). The modulator 268 is connected to supply the pulse width modulation signals 227 two gates of controllable switches comprised in the generator side converter portion 221.

The arrangement 229 further comprises an abc-dq transformation module 269 configured to transform the generator output current $i_{abc}$ in the stator frame into the fundamental dq-frame as signal 253 ($i_{dq}$).

The electric energy system 240 may for example be comprised in the wind turbine 100 as illustrated in FIG. 1 as energy system 140.

The arrangement 229 is adapted to perform a method for determining an operation parameter reference for controlling a generator side converter portion according to embodiments of the present invention.

Methods and arrangements according to embodiments of the present invention are capable to be applied to both single and multiple harmonic current controller loops, i.e. control of multiple current harmonic orders. Accordingly, harmonic reference current may be expressed as I*dqh=I*dqh1+I*dqh2+ . . . +I*dqhn, wherein h1 to hn stand for the harmonic order of interest (typically, second, fourth, sixth, eighth and twelfth harmonics). Consequently, the harmonic current controller block may be composed of multiple control loops in the respective reference frames which is not explicitly shown in FIG. 2 for sake of clarity.

The fundamental current references as derived by the fundamental current reference calculation module 247 may typically be calculated by means of controllers or look-up tables, some examples may be speed, power, torque, flux, voltage controllers, and maximum torque per ampere methods. Such controllers may provide i*dqf which are usually DC signals during steady-state operation.

The harmonic current reference calculation module 241 may target to control harmonic levels in given quantities (torque, power, voltage, flux, sound pressure, accelerations) and its output may be a sinusoidal signal varying at given frequency or a combination of sinusoidal signals with different frequencies (idqh). It may be composed of a variety of controllers (PI, search algorithms, etc.) and/or LUTs, i.e. look-up tables.

The fundamental current controller 254 may be composed of two PI-controllers in the positive synchronous reference frame and decoupling feedforward terms. Optionally, a pair of negative sequence current controllers may be included too, whose implementation details are not shown for the sake of simplicity.

The harmonic current controller 259 may be implemented by means of PI-controllers and harmonic reference frame, proportional-resonant controllers, or any other suitable method.

The transformations between the abc frame and the synchronous dq frame, i.e. module 267, may apply the well-known inverse Park transformation and module 269 may apply the Park transformation.

The voltage modulator 268 may use the reference voltages in the abc frame for generating pulse width modulation patterns or signals. The pulse width modulation signals may then be used to control power electronic switches (such as IGBTs) in the generator side converter 221.

The speed observer 266 may typically be or comprise a back-emf based observer, allowing to estimate rotor position and speed.

The bandpass filter 258 may be tuned for the specific harmonic frequencies which are to be controlled or which are of interest. The filter may be used to attenuate/remove undesired harmonics from measured currents and fundamental reference voltages, for instance, adaptive notch filters.

FIGS. 3 to 8 illustrate electrical quantities as derived and considered in embodiments of the present invention, wherein abscissas 370 denote the time and ordinates 371 indicate the strength of the respective signal around the zero points 372.

Figure 3:
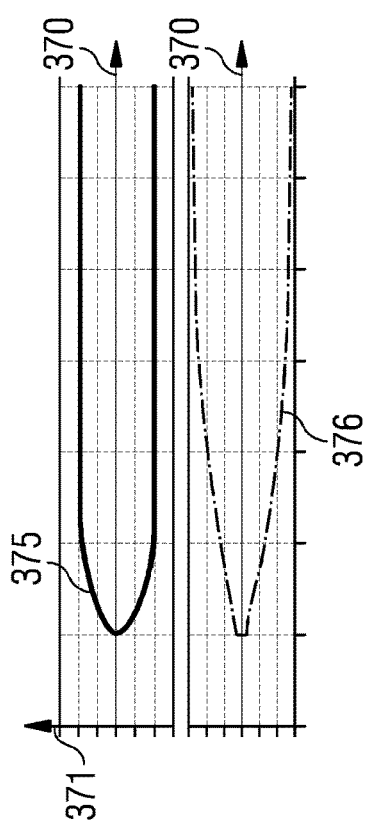
FIG. 3 illustrates a graph illustrating control performance as considered in an embodiment of the present invention.
Figure 4:
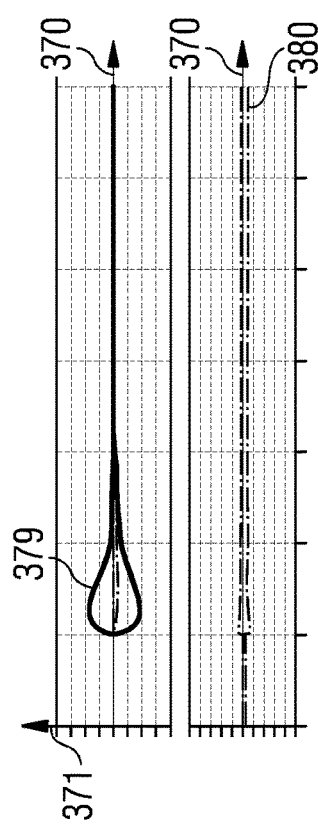
FIG. 4 illustrates a graph illustrating control performance as considered in another embodiment of the present invention.
Figure 5:
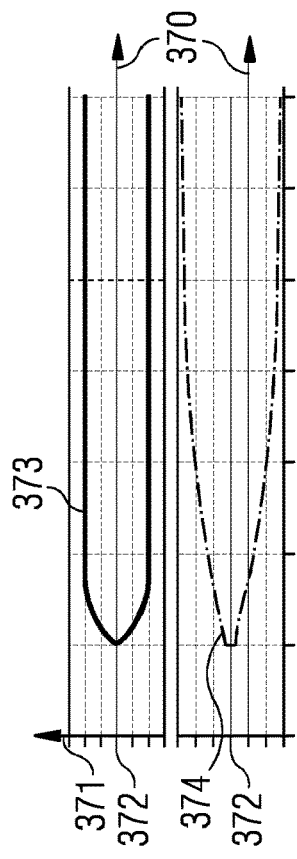
FIG. 5 illustrates a graph illustrating control performance as considered in another embodiment of the present invention.
Figure 6:
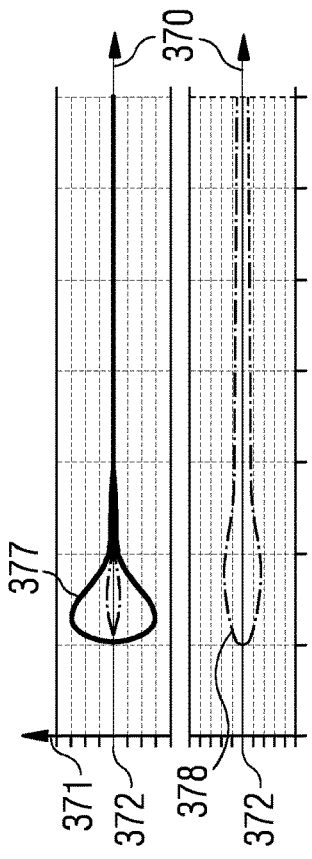
FIG. 6 illustrates a graph illustrating control performance as considered in another embodiment of the present invention.

Thereby, the signals illustrated in FIGS. 3, 5 and 7 were derived without adding the harmonic current reference to the input of the fundamental current controller and the signals illustrated in FIGS. 4, 6 and 8 were derived by adding harmonic current reference to the input of the fundamental current controller.

The trace 373 in FIG. 3 illustrates the outputs of the harmonic current reference calculation module for the sixth harmonic $I_d$, while the trace 374 illustrates the output of the harmonic current reference calculation block for the second harmonic $I_q$. In comparison thereto, FIG. 4 also illustrates the outputs of the harmonic current reference calculation for the sixth harmonic (trace 375) and the second harmonic (trace 376), in particular the component $I_d$.

The FIG. 5 illustrates the trace 377 (the sixth harmonic of the regulation errors at the input of the harmonic current controller) and the trace 378 (the second harmonic of the regulation errors at the input of the harmonic current controller). In comparison thereto, FIG. 6 illustrates in a trace 379 the sixth harmonic of the regulation error at the input of the harmonic current controller and the trace 380 illustrates the second harmonic of the regulation errors at the input of the harmonic current controller which show a strong reduction.

Traces 381, 383 and 385 in FIG. 7 illustrate the reference voltages v*dqf, v*dqh, v*dq, respectively, without adding the harmonic current reference to the input of the fundamental current controller. In comparison thereto, the traces 386, 388 and 390 illustrate the same quantities while adding the harmonic current reference to the input of the fundamental current controller.

Thus, the FIGS. 3 to 8 show the merits of the proposed control method when aiming to control the second and the sixth harmonic (Idq2 and Idq6, h1=2 and h2=6). It becomes clear that regulation errors at the input harmonic current controller are better controlled (lower overshoot and shorter settling times), the amplitude of the harmonics present in both v*dqf are lower (less polluted fundamental control signals) as well as the amplitude of the harmonic current controller output (v*dqh), reducing the control effort of the harmonic current controller. Accordingly, the new method may improve the system dynamic performance and the accuracy of the speed estimation.

Moreover, lower saturation levels may be set for the outputs of the harmonic current controller, allowing a more effective protection. Such limits may easily be predicted for the new method, depending on the machine parameters only. As opposed to the conventional method, for which saturation levels may be dependent on the controller bandwidth, used filters and harmonic order under control.

Concerning the order of the harmonic order controlled by the harmonic current controller it is noted the lower the frequency/order of the harmonic, the stronger the disturbance rejection of the fundamental controller tends to be. In other words, the most likely is that the harmonic under control falls within the fundamental current controller bandwidth. Therefore, the embodiments of the present invention may be more relevant for the control of low order harmonics such as second order harmonics in the simulation results presented.

Embodiments of the present invention provide a control method for improving harmonic control in vector-controlled drives, specifically harmonic current control. A simple solution and an effective solution is provided requiring minor changes to the control system without affecting overall performance and stability. A control method is suitable for implementation in the controller of a frequency converter.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. An arrangement for determining an operation parameter reference for controlling a generator side converter portion coupled to a generator of a wind turbine, the arrangement comprising:
an arithmetic element configured to derive a fundamental current error by subtracting an unfiltered, generator output current from a sum of a fundamental current reference and at least one harmonic current reference;
a fundamental current controller adapted to determine a fundamental operation parameter reference based on the fundamental current error;
at least one other arithmetic element configured to derive at least one harmonic current error by subtracting a band pass filtered according to the harmonics, generator output current from the at least one harmonic current reference;
at least one harmonic current controller configured to determine at least one harmonic operation parameter reference based on the harmonic current error;
still another arithmetic element configured to determine the operation parameter reference as sum of the fundamental operation parameter reference and the at least one harmonic operation parameter reference.

2. The arrangement according to claim 1, wherein the operation parameter reference is a voltage reference for controlling the generator side converter portion.

3. The arrangement according to claim 1, wherein the harmonic current reference comprises an oscillation corresponding to N times a fundamental electrical frequency of the generator, wherein N is a natural number larger than 2, wherein the harmonic current reference is different from zero.

4. The arrangement according to claim 2, wherein the fundamental voltage reference and the harmonic voltage reference are given in a fundamental dq-frame rotating with the fundamental electrical frequency of the generator.

5. The arrangement according to claim 1, wherein the fundamental current controller comprises two PI-controller, to determine the fundamental operation parameter reference using for each of the d-component and the q-component of the fundamental current error in the fundamental dq-frame one PI-controller of the two PI-controllers.

6. The arrangement according to claim 1, wherein the harmonic current controller comprises:
a transformation module configured to transform the harmonic current error in the fundamental dq-frame into a harmonic dq-frame, the harmonic dq-frame rotating with the respective multiple of the fundamental frequency;
two PI-controllers configured to receive the components of the harmonic current error in the harmonic positive sequence dq-frame as inputs;
a backtransformation module configured to backtransform the outputs of the PI-controllers into in the fundamental dq-frame, in order to determine the harmonic operation parameter reference; the harmonic current controller further comprising:
two PI-controllers configured to receive the components of the harmonic current error in the harmonic negative sequence dq-frame as inputs and corresponding transformation module and backtransformation module.

7. The arrangement according to claim 1, further comprising:
an electrical speed estimator configured and connected to estimate an electrical rotational speed and/or an electrical angle of the generator based on the generator output current and in particular further based on the unfiltered fundamental operation parameter reference.

8. The arrangement according to claim 1, wherein the fundamental current controller and/or the harmonic current controller receives as input the electrical rotational speed and/or an electrical angle estimated by the electrical speed estimator.

9. The arrangement according to claim 1, further comprising:
- at least one harmonic current reference calculation module configured to calculate the harmonic current reference based on at least one current reference input; and/or
- a fundamental current reference calculation module configured to calculate the fundamental current reference based on at least one of the current reference input, wherein the current reference input comprises:
- the operation parameter reference, in particular voltage reference, and/or
- the generator output current, and/or
- a DC-link voltage, and/or
- an electrical frequency of the generator, and/or
- an electrical angle of the generator, and/or
- a torque, and/or
- an acceleration and/or
- a sound pressure.

10. The arrangement according to claim 1, further comprising:
- a dq-abc-transformation module configured to transform the operation parameter reference given in the fundamental dq-frame into a stator frame;
- a modulator configured to derive pulse width modulation signals based on the operation parameter reference given in the stator frame and connected to supply the width modulation signals to gates of controllable switches comprised in the generator side converter portion.

11. The arrangement according to claim 1, further comprising:
- a abc-dq-transformation module configured to transform the generator output current in the stator frame into the fundamental dq-frame.

12. An electric energy system, comprising:
- a generator;
- a converter comprising a generator side converter portion coupled to the generator; and
- an arrangement according to claim 1.

13. A wind turbine, comprising the electric energy system according to claim 12.

14. A method for determining an operation parameter reference for controlling a generator side converter portion coupled to a generator, in particular of a wind turbine, the method comprising:
- deriving a fundamental current error by subtracting a generator output current from a sum of a fundamental current reference and at least one harmonic current reference;
- determining a fundamental operation parameter reference based on the fundamental current error;
- deriving at least one harmonic current error by subtracting a filtered generator output current from the at least one harmonic current reference;
- determining at least one harmonic operation parameter reference based on the at least one harmonic current error;
- determining the operation parameter reference as sum of the fundamental operation parameter reference and the at least one harmonic operation parameter reference.

15. The method for controlling a generator side converter portion coupled to a generator, comprising:
- performing a method for determining an operation parameter reference according to claim 14 and
- controlling the generator side converter portion coupled to a generator based on the operation parameter reference.

* * * * *